United States Patent
Rachon

(10) Patent No.: US 10,689,148 B2
(45) Date of Patent: Jun. 23, 2020

(54) REUSABLE BREAK PACK CARTON

(71) Applicant: Walmart Apollo, LLC, Bentonville, AR (US)

(72) Inventor: Jolene Michelle Rachon, Greeneville, TN (US)

(73) Assignee: Walmart Apollo, LLC, Bentonville, AR (US)

( * ) Notice: Subject to any disclaimer, the term of this patent is extended or adjusted under 35 U.S.C. 154(b) by 78 days.

(21) Appl. No.: 15/805,690

(22) Filed: Nov. 7, 2017

(65) Prior Publication Data

US 2018/0194510 A1    Jul. 12, 2018

Related U.S. Application Data

(60) Provisional application No. 62/445,099, filed on Jan. 11, 2017.

(51) Int. Cl.
| | | |
|---|---|---|
| *B65D 5/36* | (2006.01) | |
| *B65D 5/42* | (2006.01) | |
| *B65D 5/66* | (2006.01) | |

(52) U.S. Cl.
CPC ......... *B65D 5/3621* (2013.01); *B65D 5/4266* (2013.01); *B65D 5/6608* (2013.01); *Y02W 30/807* (2015.05)

(58) Field of Classification Search
CPC ...... B65D 5/3678; B65D 19/06; B65D 5/241; Y10S 229/918; Y10S 229/92
See application file for complete search history.

(56) References Cited

U.S. PATENT DOCUMENTS

| | | | |
|---|---|---|---|
| 1,985,111 A | 12/1934 | Shofer et al. | |
| 3,003,680 A | 10/1961 | Wilcox, Jr. | |
| 3,007,622 A * | 11/1961 | George | B65D 5/324 |
| | | | 229/122.21 |
| 3,193,176 A | 7/1965 | Gullickson | |
| 3,701,466 A * | 10/1972 | Woodrow | B65D 5/566 |
| | | | 229/221 |
| 4,056,223 A * | 11/1977 | Williams | B65D 5/0045 |
| | | | 229/160 |
| 5,062,527 A * | 11/1991 | Westerman | B65D 5/3678 |
| | | | 229/117 |
| 5,145,110 A * | 9/1992 | Terpstra | B65D 5/10 |
| | | | 229/155 |
| 5,318,219 A * | 6/1994 | Smith | B65D 19/06 |
| | | | 206/386 |

(Continued)

OTHER PUBLICATIONS

Shanghai De Print Box, Foldable/Collapsible Rigid Box/ Set up Box, Accessed on the Internet at http://www.deprintedbox.com/collapsible-rigid-box.php on Dec. 30, 2016.

(Continued)

*Primary Examiner* — Brian D Nash
(74) *Attorney, Agent, or Firm* — McCarter & English, LLP; David R. Burns

(57) ABSTRACT

Exemplary embodiments of the present disclosure are directed to a reusable break pack carton formed using single sheet construction that has the ability to be repeatedly flattened and assembled without severing the joints. The break pack carton can include self-locking members configured to form a bottom wall of the break pack carton in the assembled state and a reinforced multi-layer top wall.

14 Claims, 9 Drawing Sheets

(56) References Cited

U.S. PATENT DOCUMENTS 6,837,420 B2 * 1/2005 Westerman .......... B65D 5/2057
229/117.15
7,487,904 B2 2/2009 McClure

OTHER PUBLICATIONS

Revobox, Side Double wing box, Accessed on the Internet at https://www.revobox.it/sistemi-automontanti/side/ on Dec. 30, 2016.
VerTerra Dinnerware, Collapsible Box with Attached Lid—Small Rectangle (10 count), Accessed on the Internet at http://www.verterra.com/products/verterra-dinnerware-4x6-small-rectangle-balsa-wood-collapsible-box-with-attached-lid on Dec. 30, 2016.
East Color Printing & Packing Co.,Ltd, Gift Box, Paper Gift Box,Lid and Base Box, Foldable Box, Registered on Apr. 11, 2012. Accessed on the Internet at https://eastcoloren.ec21.com/Gift_Box_Paper_Gift_Box--6566452_6838598. html on Dec. 30, 2016.

* cited by examiner

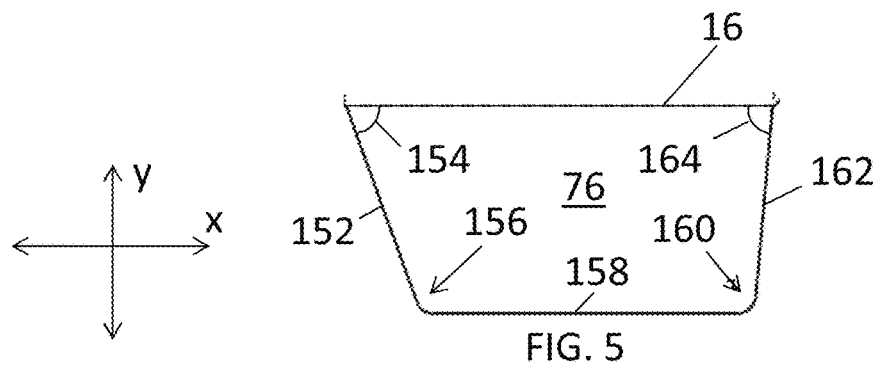
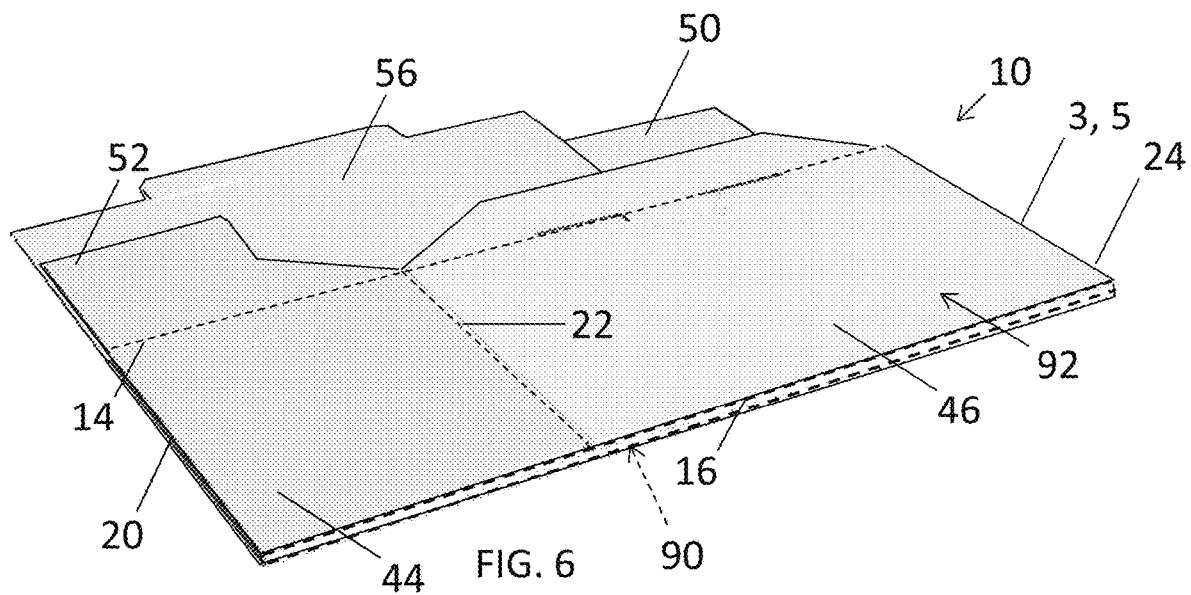

REUSABLE BREAK PACK CARTON

CROSS-REFERENCE TO RELATED PATENT APPLICATIONS

This application claims priority to U.S. Provisional Application No. 62/445,099, filed Jan. 11, 2017, the entire contents of which is incorporated herein by reference in its entirety.

BACKGROUND

Conventional break pack cartons often have limited reusability and unacceptably low life cycles. Additionally, conventional break pack cartons typically have openings that allow small products stored therein to fall out of the cartons.

BRIEF DESCRIPTION OF THE DRAWINGS

FIGS. 2-5 depict flap portions of a break pack carton configured for self-formation of a bottom wall of the break pack carton in accordance with embodiments of the present disclosure.

FIG. 6 depicts a break pack carton in a collapsed state with interlocking members folded into the break pack carton in accordance with embodiments of the present disclosure.

DETAILED DESCRIPTION

Figure 1:
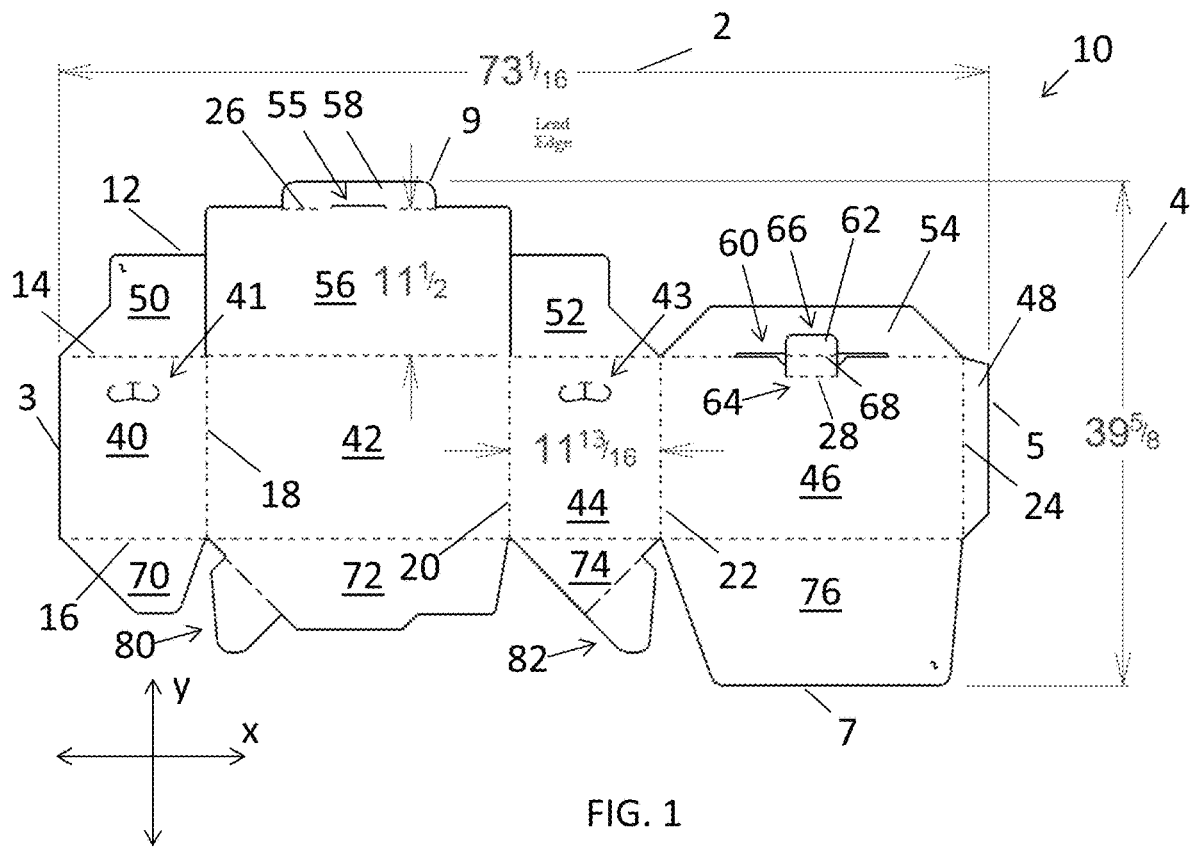
FIG. 1 is a schematic diagram of a break pack carton in a collapsed state in accordance with embodiments of the present disclosure.

Exemplary embodiments of the present disclosure are directed to a reusable break pack carton that overcomes disadvantages associated with conventional break pack cartons. For example, exemplary embodiments of the present disclosure provide for a reusable break pack carton form using single sheet construction that has the ability to be repeatedly flattened and assembled without severing the joints. Exemplary embodiments of the break pack carton also includes self-locking members configured to form a bottom wall of the break pack carton in the assembled state with a reinforcing member to strengthen the bottom wall of the break pack and to provide a bottom wall structure that prevent small objects from falling out of the break pack carton when it is in the assembled form.

In accordance with embodiments of the present disclosure, a reusable break pack carton can include a single sheet of cardboard material having a perimeter with a first end and a second end. Fold lines can be formed in the single sheet of material. The fold lines can include first and second fold lines extending in parallel to each other from the first end of the perimeter to the second end of the perimeter. Wall portions can be bounded by at least three of the fold lines. The carton can also include first flap portions bounded by the first fold line and the perimeter, and second flap portions bounded by the second fold line and the perimeter. Each of the second flap portions can have a different shape, which can be irregular.

The first and second ends of the perimeter can be operatively coupled to each other to form a carton body with an interior area. The carton body can be configured to be positioned in a collapsed state and an assembled state. The interior area forms an undivided volume for receiving objects in the assembled state. The first flap portions can be disposed external to the interior area in the collapsed state. The second flap portions can be folded about the second fold line into the interior area and are sandwiched between the side wall portions in the collapsed state.

In transition between the collapsed state and the assembled state, the second plurality of flap portions automatically rotate outwardly about the second fold line. First through third flap portions of the second flap portions can automatically interlockingly engage to facilitate self-formation of a portion of a bottom wall in the assembled state. Two of the first through third flap portions of the second flap portions can include locking tabs. A fourth flap portion of the second flap portions can rests on the first through third flap portions in the assembled state.

The first flap portions of the cart on can fold inwardly about the first fold line to be generally perpendicular to the side wall portions to form a layered top wall in the assembled state. First through third flap portions of the first flap portions can form an inner top wall in the assembled state. A lid portion can extend from the first fold line and can fold inwardly towards the interior area to overlay the first through third flap portions of the first flap portions to form an outer top wall in the assembled state.

In accordance with embodiments, a method of using a break pack carton can include applying a force to the carton body in a collapsed state to urge side wall portions of the carton body outwardly to increase a volume of an interior area of the body, rotating the second flap portions outwardly from the interior area in response the volume of the interior area of the carton body increasing, and self-forming of a bottom wall of the carton body by the second plurality of flap portions when opposing ones of the side portions are in parallel to each other. The self-formation of the bottom wall can include automatic interlocking engagement of three flap portions of the second flap portions and an additional one of the second flap portions resting on the three flap portions of the second flap portions to place the carton body in the assembled state.

The method can also include rotating the first flap portions inwardly to be perpendicular to the side wall portions to form an inner top wall, rotating a lid portion inwardly to be perpendicular to the side wall portions and to overlay the inner top wall to form an outer top wall, and locking the lid portion in place via a tab extending from one of the side wall portions.

The method can also include unlocking a lid portion from one of the side wall portions, rotating a lid portion outwardly away from the interior area, rotating the first plurality of flap portions outwardly away from the interior area, urging the second plurality flap inwardly towards the interior area to disengage the interlocking engagement of the three flap portions of the second plurality of flap portions. The opposing ones of the side wall portions can be urged from being perpendicular to each other to being generally parallel to each other, and the second flap portions can be sandwiched between the side wall portions to return the carton body to the collapsed state.

FIG. 1 is a schematic diagram of a break pack carton 10 in a deconstructed state laid flat in accordance with embodiments of the present disclosure. In exemplary embodiments, the break pack carton 10 can be formed from a single sheet of material, such as corrugated cardboard. As shown in FIG. 1, the break pack carton 10 can have an irregularly shaped perimeter 12 in the collapsed state and can include fold lines 14-28. A maximum length 2 of the perimeter 12 of the break pack carton 10 can be measured along an x-axis and can extend from a first end 3 of the perimeter 12 to a second end 5 of the perimeter 12. In exemplary embodiments, the first end and the second end 5 can be operatively coupled and/or integrally formed with one another (e.g., as shown in FIGS. 2-7). A maximum width 4 of the perimeter 12 can be measured along a y-axis between a third end 7 of the perimeter 12 and a fourth end 9 of the perimeter 12. The x-axis and the y-axis are perpendicular to each other.

The fold lines 14 and 16 can be spaced away from each other and can extend in parallel along the x-axis from the first end 3 to the second end 5 of the perimeter. The fold lines 18-24 can each extend along the y-axis between the fold lines 14 and 16 such that the fold lines 18-24 are bound by the fold lines 14 and 16 and extend perpendicular to the fold lines 14 and 16. That fold lines 18-24 can be spaced apart from each other. The fold lines 26 and 28 can extend along the x-axis in parallel with the fold lines 14 and 16.

The perimeter 12 and the fold lines 14-28 can define structural portions of the break pack carton 10 when the break pack carton 10 is in the assembled state. For example, a (first) side wall portion 40 can be formed and bounded by the first end 3 of the perimeter 12, and the fold lines 14, 16, and 18. A (second) side wall portion 42 can be formed and bounded by the fold lines 14, 16, 18, and 20. A (third) side wall portion 44 can be formed and bounded by the fold lines 14, 16, 20, and 22. A (fourth) side wall portion 46 can be formed and bounded by the fold lines 14, 16, 22, and 24. The (first through fourth) wall portion can have a generally rectangular shape. The (first and third) wall portions 40 and 44 can have identical dimensions (within manufacturing tolerances), and can form opposing side walls of the break pack carton 10 when the break pack carton is in the assembled state. The (second and fourth) wall portions 42 and 46 can have identical dimensions (within manufacturing tolerances), and can form opposing side walls of the break pack 10 when the break pack carton 10 is in the assembled state. In exemplary embodiments, the (second and fourth) wall portions 42 and 46 can have at least twice the surface area as the (first and third) wall portions 40 and 44. Perforated cutouts 41 and 43 can be formed in the (first and third) wall portions 40 and 44, respectively. A trapezoidal tab 48 can extend between the fold line 24 and the second end of the perimeter 12. The trapezoidal tab 48 can be affixed to the side wall portion 40 before, during, or after manufacturing of the carton 10. Separate and distinct flap portions 50-54 (e.g., first through third flap portions) can each be formed and bounded by the perimeter 12 and the fold line 14. Slit 60 can be formed along the fold line 14 between the wall portion 46 and the (third) flap portion 54. The (first and second) flap portions 50 and 52 can be mirror images of each other, and the flap 54 can have a trapezoidal shape. Additionally, the flap portions 50 and 52 can have notched perimeter portions. A lid portion 56 can be formed by the perimeter and the fold lines 14 and 26. The lid portion 56 can have a rectangular shape. A (fourth) flap 58 can be formed and bounded by the perimeter 12 and the fold line 26. The (fourth) flap 58 can have a generally rectangular shape where the perimeter 12 forms two rounded corners and the perimeter in combination with the fold line 26 forms two pointed or squared corners. A slit 55 can be formed along the fold line 26 between the lid portion 56 and the flap portion 58. Additionally, an independently articulable locking tab 62 can be formed to extend from the wall portion 46 and overlay the slit(s) 60 and the (third) flap portion 54. The locking tab 62 can include a base end 64 formed by the fold line 28, which is offset from the fold line 14 towards the fold line 16, and can include a terminal free end 66. The tab 62 can be foldable along the fold lines 28 and 68. The fold line 68 can extend parallel to the fold 14 and can be aligned with the fold line 14 at the time of manufacture (e.g., such that the fold lines 14 and 68 can be formed together during the manufacturing process).

Separate and distinct flap portions 70-76 (e.g., fifth-eighth flap portions) can each be formed and bounded by the perimeter 12 and the fold line 16. Each of the flap portions 70-76 can have a different irregular shape, surface area, size, and dimensions. For example, the flap portion 70 can have an asymmetrical trapezoidal shape, the flap portion 72 can have an irregular stepped trapezoidal base shape with a locking tab 80 extending from one of the sides of the irregular stepped base trapezoidal shape, the flap portion 74 can have a generally equilateral triangular base shape with a locking tab 82 extending from one of the sides of the generally triangular base shape, and the flap portion 76 can have a generally asymmetrical trapezoidal shape. In exemplary embodiments, the locking tabs 80 and 82 can generally have identical shapes. In an example embodiment, the locking tabs 80 and 82 can have rounded trapezoidal shapes. The flap portions 70-76 can interlock to form a bottom wall of the break pack carton 10 when the break pack carton is in the assembled state.

Figure 2:
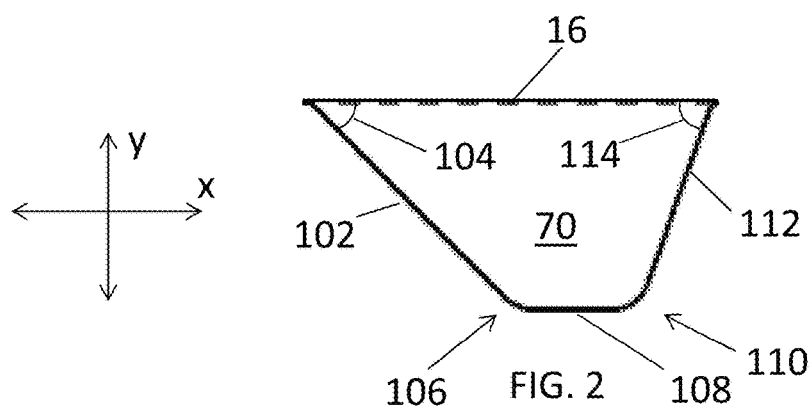

FIG. 2 depicts a detailed view of the flap portion 70 shown in FIG. 1 in accordance with embodiments of the present disclosure. As shown in FIG. 2, the flap portion 70 can have an asymmetrical trapezoidal shape. The fold line 16 can form one side of the flap portion 70 and can extend along and in parallel to the x-axis. A side 102 can extend from a first end of the fold line 16 at a first angle 104 to a rounded corner 106. The side 102 can have a first length. A side 108 can extend along and in parallel to the x-axis from the rounded corner 106 to a rounded corner 110 and can have a second length. A side 112 can extend between the rounded corner 110 and the fold line 16 at a second angle 114. The first and second angles can be different and the second angle can be greater than the first angle. Each of the sides 102, 108, 112, and the side formed by the fold line 16 can have different lengths, where the side formed by the fold line 16 is the longest side, the second 102 is the second longest side, the side 112 is the third longest side, and the side 108 is the least longest side.

Figure 3:
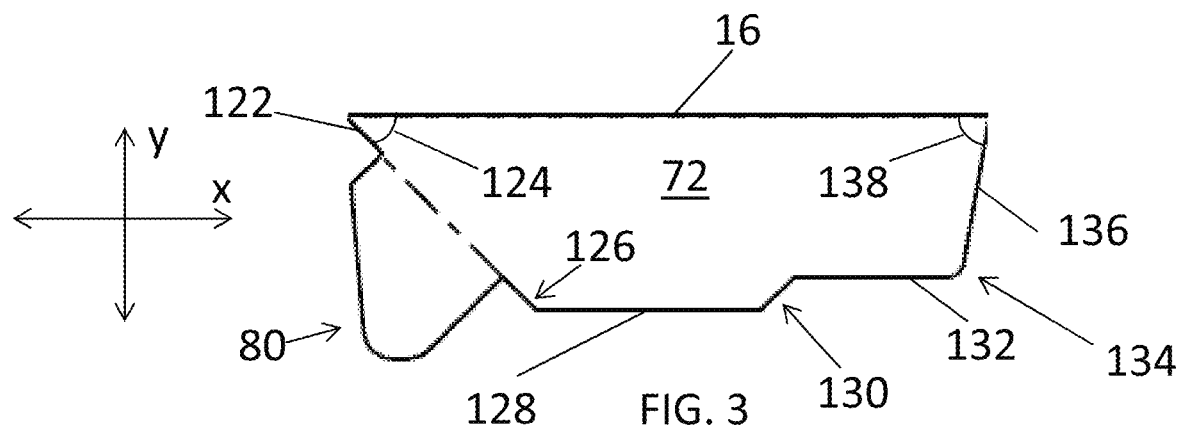

FIG. 3 depicts a detailed view of the flap portion 72 shown in FIG. 1 in accordance with embodiments of the present disclosure. As shown in FIG. 3, the flap portion 72 can have a truncated asymmetrical trapezoidal shape with a locking tab 80 extending from one of the sides. The fold line 16 can form one side of the flap portion 72 and can extend along and in parallel to the x-axis. A side 122 can extend from a first end of the fold line 16 at a first angle 124 to a sharp corner 126 having an obtuse angle. The locking tab 80 can extend from the side 102 as shown in FIG. 3. A side 128 can extend along and in parallel to the x-axis from the corner 126 to a transition step 130, which extends towards the fold line 16. A side 132 can extend along and in parallel to the x-axis from the transition step 130 to a rounded corner 134. A side 136 can extend between the rounded corner 134 and the fold line 16 at a second angle 138. The first and second angles can be different and the second angle can be greater than the first angle. Each of the sides 102, 108, 112, and the side formed by the fold line 16 can have different lengths. The side 128 can be longer the side 132.

Figure 4:
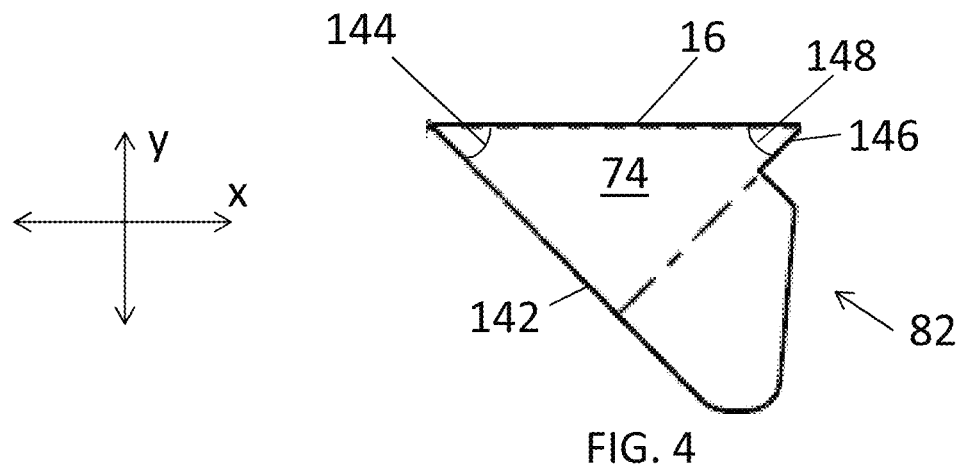

FIG. 4 depicts a detailed view of the flap portion 74 shown in FIG. 1 in accordance with embodiments of the present disclosure. As shown in FIG. 4, the flap portion 74 can have a triangular shape with the locking tab 82 extending from one of the sides. The fold line 16 can form one side of the flap portion 74 and can extend along and in parallel to the x-axis. A side 142 can extend from a first end of the fold line 16 at a first angle 144. A side 146 can extend from the fold line 16 at a second angle 148. The locking tab 82 can extend from the side 146 as shown in FIG. 4. The first and second angles can be equal to each other.

FIG. 5 depicts a detailed view of the flap portion 76 shown in FIG. 1 in accordance with embodiments of the present disclosure. As shown in FIG. 5, the flap portion 76 can have an asymmetrical trapezoidal shape. The fold line 16 can form one side of the flap portion 76 and can extend along and in parallel to the x-axis. A side 152 can extend from a first end of the fold line 16 at a first angle 154 to a rounded corner 156. The side 152 can have a first length. A side 158 can extend along and in parallel to the x-axis from the rounded corner 156 to a rounded corner 160 and can have a second length. A side 162 can extend between the rounded corner 160 and the fold line 16 at a second angle 164. The first and second angles can be different and the second angle can be greater than the first angle. Each of the sides 152, 158, 162, and the side formed by the fold line 16 can have different lengths, where the side formed by the fold line 16 is the longest side, the side 158 is the second longest side, the side 152 is the third longest side, and the side 162 is the least longest side.

FIG. 6 depicts an embodiment of the break pack carton 10 in the collapsed state with the first and second ends 3 and 5 of the perimeter 12 operatively coupled and/or integrally formed to create carton body 92 with an interior area 90 defined by the wall portions 40-46 in accordance with embodiments of the present disclosure. For example, the first and second ends 3 and 5 of the perimeter can be operatively coupled by affixing the tab 48 (FIG. 1) to the side wall portion 40.

The flap portions 70-76 (FIG. 1) can be folded into the interior area 90 of the body 92 of the break pack carton 10 along the fold line 16. The flap portions 70-76 can be folded into the interior area 90 to have a specified arrangement to facilitate self-formation of the bottom wall of the break pack carton 10 from each of the differently shaped distinct and independently moveable flap portions 70-76 when the break pack carton 10 is in the assembled state. In the collapsed state the flap portions 70-76 can be held in place by a force applied by the surrounding wall portions such that the flap portions 70-76 are folded about the fold line 16 by about one hundred seventy degrees to approximately one hundred eighty degrees relative to their adjacent wall portions and orientations shown in FIG. 1.

The portions 50-56 can lay generally flat in the collapsed state outside of the interior area 90. In the collapsed state, a first pair of wall portions can reside in a first plane and a second pair of wall portions can reside in a second plane. For example, as shown in FIG. 6 adjacent wall portions 44 and 46 can reside in a first plane and adjacent wall portions 40 and 42 can reside in a second plane that is parallel to and underneath the first plane. The wall portions can be folded along fold lines 20 and 24.

Figure 7:
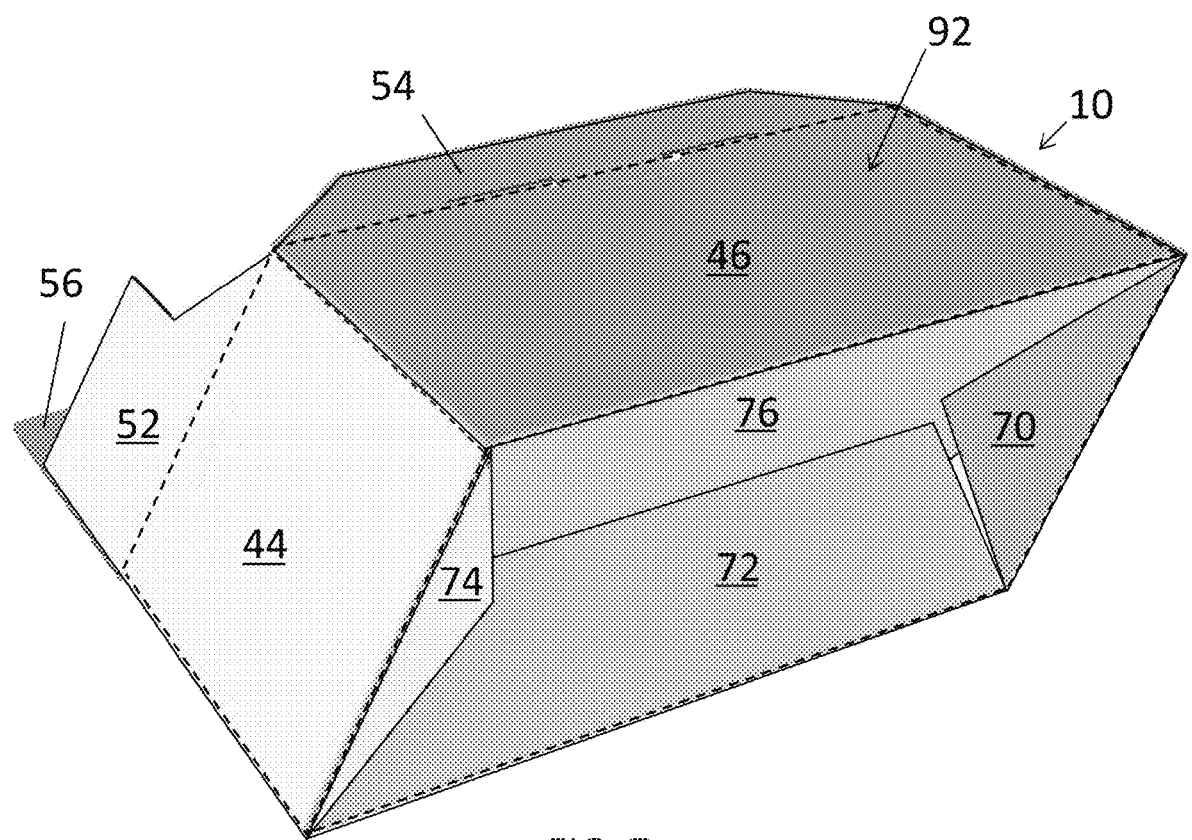
FIG. 7 depicts an exterior view of a break pack carton in transition from a collapsed state to an assemble state in accordance with embodiments of the present disclosure.
Figure 8:
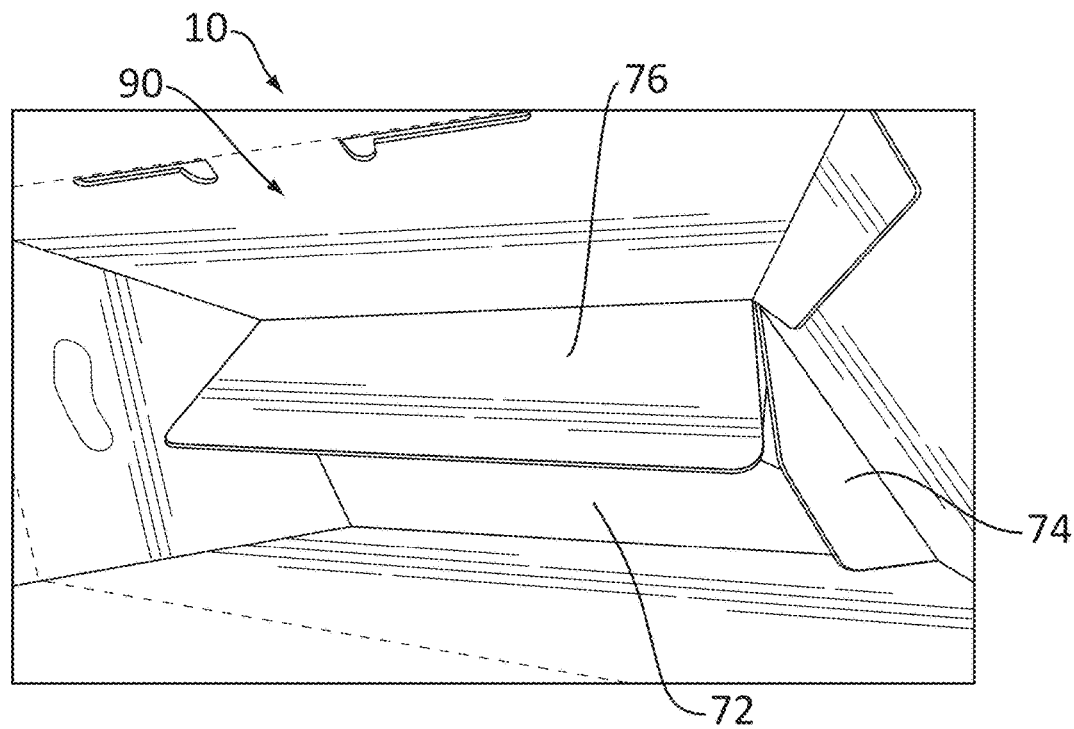
FIG. 8 depicts an interior view of a break pack carton in transition from a collapsed state to an assemble state in accordance with embodiments of the present disclosure.

FIG. 7 depicts an exterior view of an embodiment of the break pack carton 10 in transition from a collapsed state to an assembled state in accordance with embodiments of the present disclosure. FIG. 8 depicts an interior view of an embodiment of the break pack carton 10 in transition from a collapsed state to an assembled state in accordance with embodiments of the present disclosure. Referring to FIGS. 7 and 8, to transition from the collapsed state to the assembled state, a user (e.g., human or robot) can hold/position the carton 10 in its collapsed form and can urge the wall portions outwardly away from each other (e.g., by applying a force to the carton body 92 about the fold lines 20 and 24 and/or about fold lines 18 and 22). As the wall portions are urged outwardly away from each other, each of the side wall portions 40-46 can rotate about their respective fold lines such that wall portions 40 and 44 move towards being opposingly spaced and parallel to each other, and wall portions 42 and 46 move towards being opposingly spaced and parallel to each other.

As the wall portions 40-46 rotate about their respect fold lines, the interior area of the carton body 92 expands and the force on each of the flap portions 70-76 from the wall portions 40-46 reduces, and each of the flap portions 70-76 automatically begin to rotate outwardly about the fold line 16 towards being approximately ninety degrees relative to their adjacent wall portions without user intervention. As the flap portions 70-76 automatically rotate about the fold line 16 due to the increasing interior area 90 and reduced force, the individual flap portions 70-74 automatically interlockingly engage each other without user intervention, via the locking tabs 80 and 82, to facilitate self-formation of a portion of a bottom wall of the carton 10, and the flap portion 76 unfolds to rest on the interlockingly engaged flap portions 70-74 to complete the self-formation of the bottom wall of the carton 10. When the bottom wall is formed, the locking tab 80 is sandwiched between the flap portion 70 and the flap portion 76, and the locking tab 82 is sandwiched between the flap portion 72 and the flap portion 76.

Figure 9:
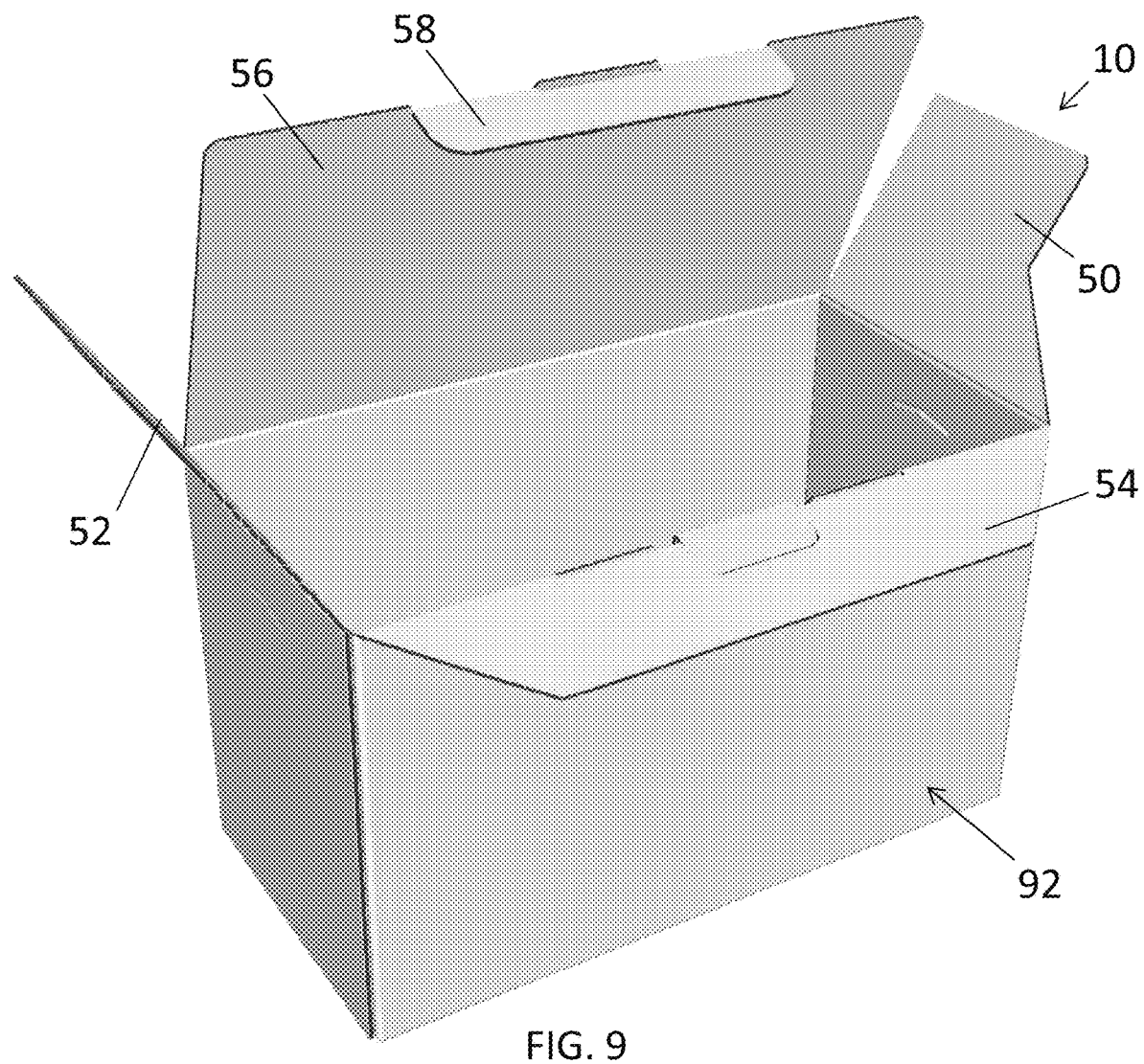
FIG. 9 depicts an exterior view of a break pack carton in an assemble state with the lid open in accordance with embodiments of the present disclosure.
Figure 10:
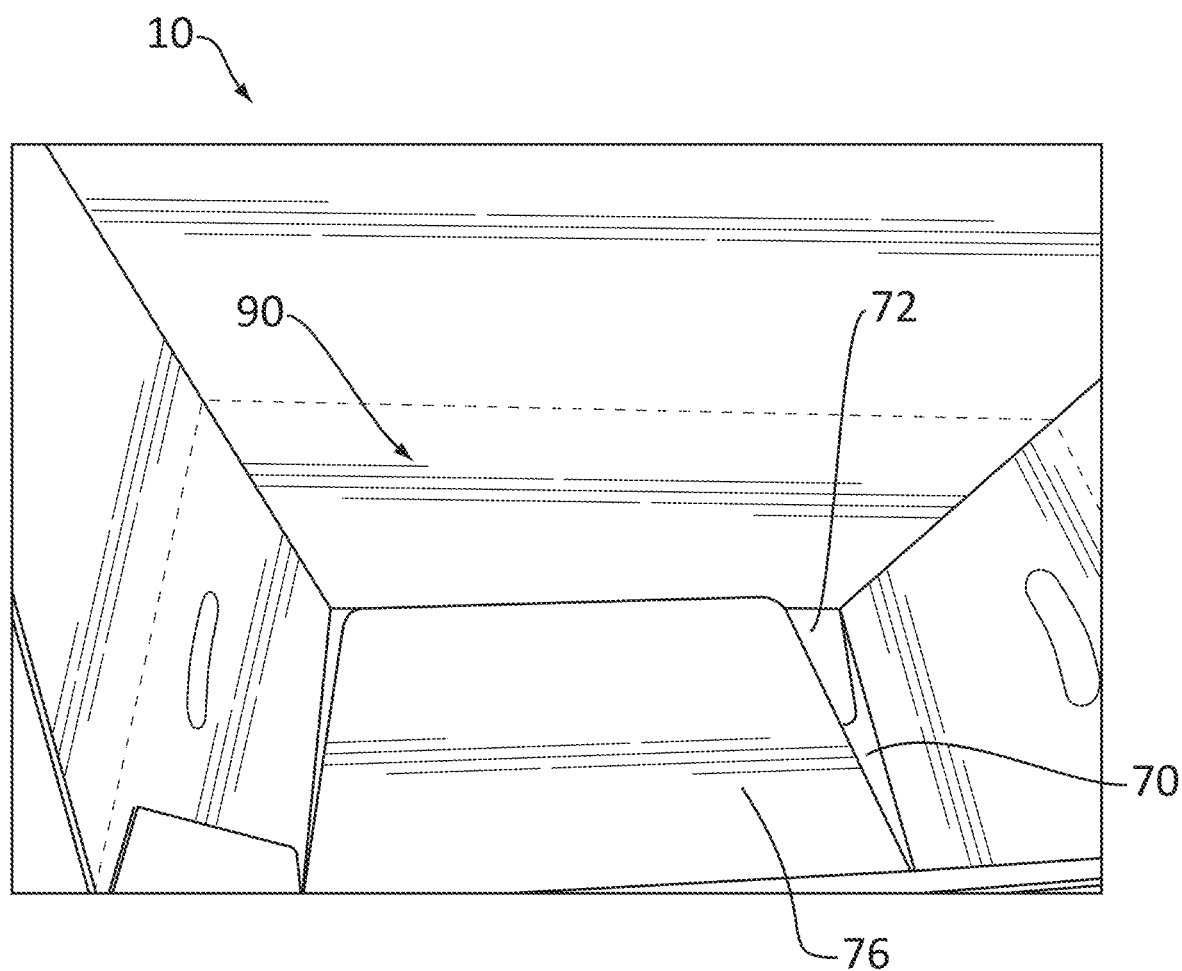
FIG. 10 depicts an interior view of a break pack carton in an assemble state with the lid open in accordance with embodiments of the present disclosure.

FIG. 9 depicts an exterior view of an embodiment of the break pack carton 10 in an assembled state with the lid portion 56 open in accordance with the present disclosure. FIG. 10 depicts an interior view of an embodiment of the break pack carton 10 in an assembled state with the lid portion 56 open in accordance with embodiments of the present disclosure. Referring to FIGS. 9 and 10, once the wall portions 40 and 44 are parallel to and opposingly spaced from each other, the wall portions 42 and 46 are parallel to and opposingly spaced from each other, the wall portions 40 and 44 are disposed perpendicular to the wall portions 42 and 46, the flap portions 70-74 are fully interlocked, and the flap portion 76 rests on the interlocked flap portions 70-74 to form the bottom wall of the carton 10. The flap portion 76 can have dimensions that are slight less than the dimensions of the bottom wall and can form an inner wall surface of the bottom wall that directly supports items placed in the carton 10. Thus, the bottom wall of the carton 10 can be formed from the flap portions 70-76 without requiring glue, tape, staples, or other reinforcing means to reinforce the bottom wall.

In the assembled state, the interior area 90 of the carton body 92 has a maximum volume creating an undivided volume for receiving objects through the open top of the carton 10. To close the carton 10, the flap portions 50 and 52 are folded inwardly towards the interior area about fold line 14 until the flap portions 50 and 52 are approximately perpendicular to the wall portions 40-46. The notched portions of the flap portions 50 and 52, respectively, form a negative trapezoidal space. The flap portion 54 can also be folded inwardly towards the interior area about the fold line 14 until the flap portion 54 is approximately perpendicular to the wall portions and parallel to the flap portions 50 and 52. When the flap portion 54 is folded into this position, the trapezoidal shape of the flap portion 54 can fill the trapezoidal negative space formed by the flap portions 50 and 52 to form an inner top wall of the carton 10.

Once the inner top wall of the carton 10 is formed, the lid portion 56 can be folded inwardly towards the interior area about the fold line 14 until the lid portion 56 is approximately perpendicular to the wall portions and approximately parallel to, and overlaying the flap portions 50-54. The flap portion 58 extending from lid portion 56 can be folded along the fold line 26 so that the flap portion 58 is approximately perpendicular to the lid portion 56. In this position, the flap portion 58 can be directed downwardly through the slit(s) 60 into the interior area. The free terminal end 66 of the tab 62 extending from the wall portion 46 can be articulated via fold lines 28 and 28 to slide through the slit 55 between the lid portion 56 and the flap portion 58 when the lid portion 56 overlays the flap portions 50-54 and the flap portion 58 extends downwardly into the interior area of the carton 10 to lock the lid portion 56 in the closed position. Once locked in the closed position, the lid portion 56 forms an outer top wall of the carton 10. Thus, the top wall of the carton 10 can be formed from the flap portions 50-54 and lid portion 56 without requiring glue, tape, staples, or other reinforcing means to reinforce the top wall.

Figure 11:
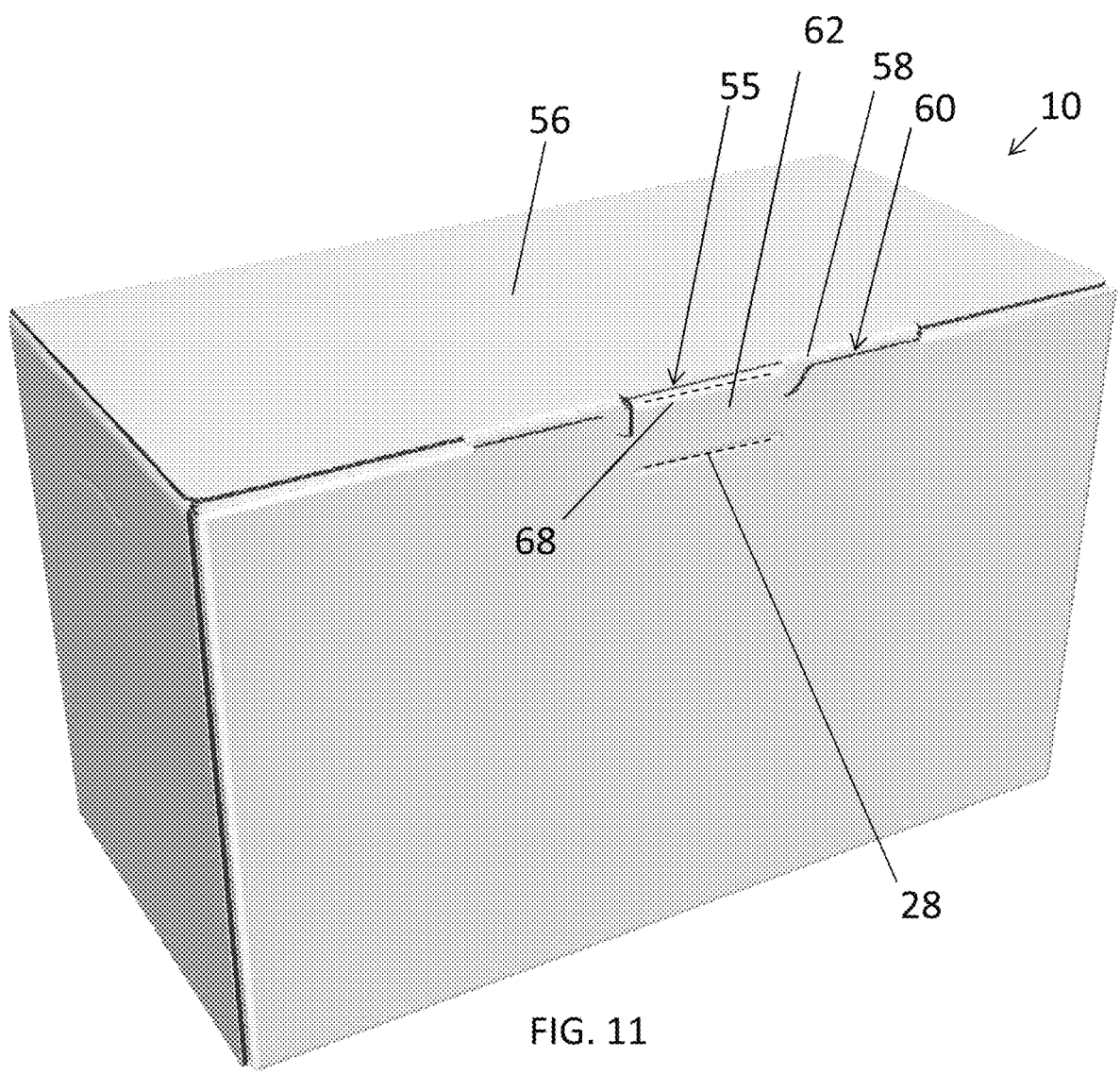
FIG. 11 depicts an exterior view of a break pack carton in an assemble state with the lid closed in accordance with embodiments of the present disclosure.

FIG. 11 depicts an exterior view of an embodiment of the break pack carton 10 in an assembled state with the lid portion 56 closed and in a locked position in accordance with the present disclosure. As shown in FIG. 7, the lid portion is folded to be generally perpendicular to the side wall portions and to overlay the flap portions 50-54 (FIG. 5). The flap portion 58 can extend through the slit 60 and the terminal free end of the tab 62 can extend into and through the slit 55 formed between the lid portion 56 and the flap portion 58 to place the lid in the locked position. The tab 62 can be rotated along the fold lines 28 and 68 to move the terminal free end into and out of the slit 55.

After use embodiments of the break pack carton 10 can be returned to the collapsed state for storage or transport. The carton 10 can remain in the collapsed state until the carton is placed in the assembled state for reuse. To place the carton 10 in the collapsed state, the tab 62 can be removed from the slit 55 and the lid portion 56 can be rotated to the open position. The flap portions 70-74 can be urged inwardly into the interior area 90; thereby forcing the flap 76 inwardly as well. After the flap portions 70-76 are urged inwardly, the side wall portions can be rotated about their respect fold lines (e.g., fold lines 18-24) to flatten the carton 10 and sandwich the flap portions 70-76 between the flatted side wall portions 40-46, e.g., as shown in FIG. 6.

Embodiments of the carton can be formed using single sheet construction that has the ability to be repeatedly flattened and assembled without severing the joints or requiring glue, tape, staples, or other extraneous securing means. Exemplary embodiments of the break pack carton also includes self-locking members configured to form a bottom wall of the break pack carton in the assembled state with a reinforcing member to strengthen the bottom wall of the break pack and to provide a bottom wall structure that prevent small objects from falling out of the break pack carton when it is in the assembled form.

Figure 12:
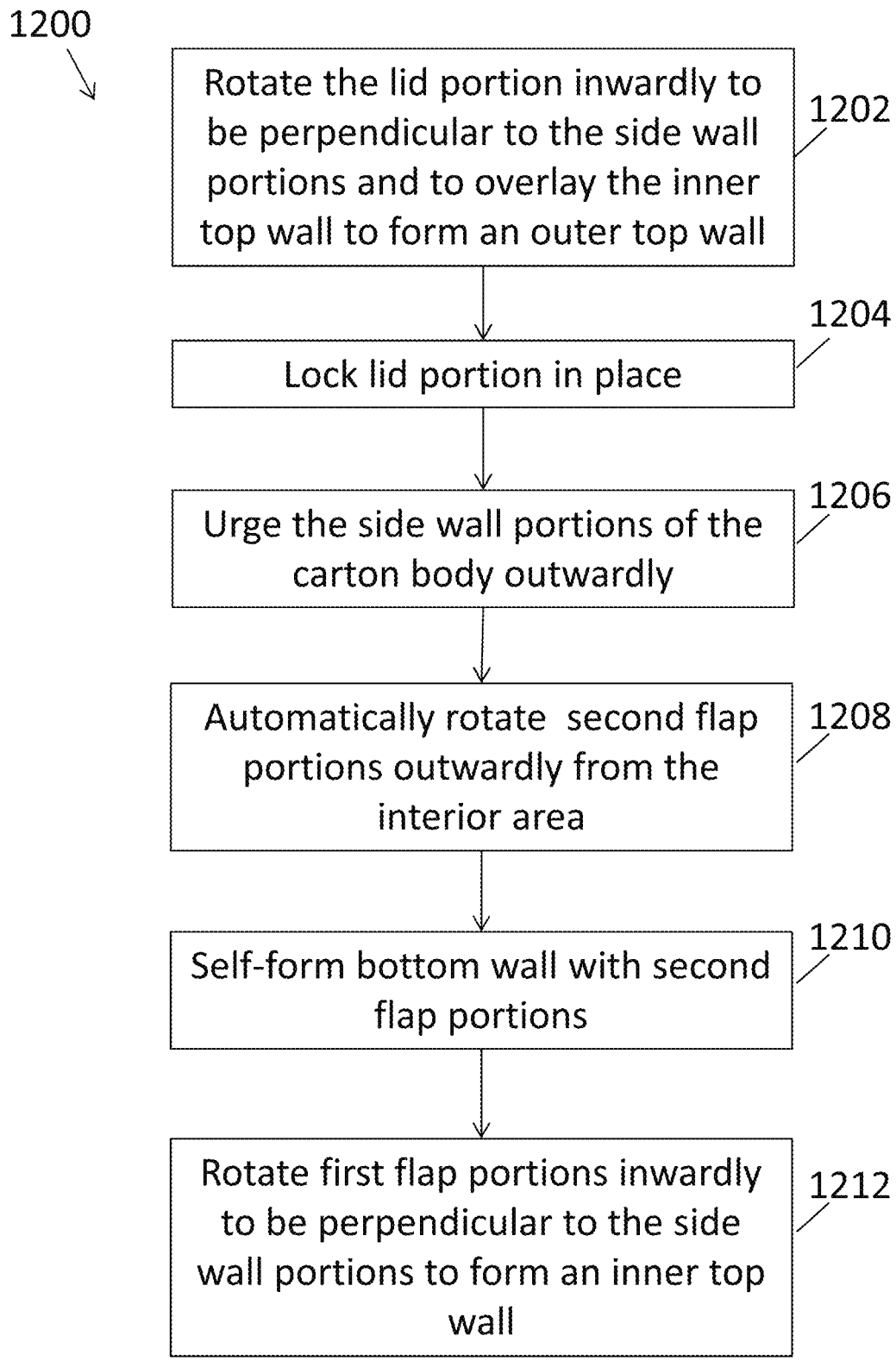
FIG. 12 is a flowchart illustrating a method of assembling a break pack carton in accordance with embodiments of the present disclosure.

FIG. 12 is a flowchart illustrating a method 1200 of using an embodiment of the break pack carton 10. At operation 1202, a force is applied to the carton body in a collapsed state to urge the side wall portions of the carton body outwardly to increase a volume of an interior area of the body. At operation 1204, the second flap portions automatically rotate outwardly from the interior area in response to the volume of the interior area of the carton body increasing. At operation 1206, the bottom wall of the carton body is self-formed by the second plurality of flap portions when opposing ones of the side portions are parallel to each other. The self-formation of the bottom wall can include automatic interlocking engagement of three flap portions of the second flap portions and an additional one of the second flap portions resting on the three flap portions of the second flap portions to place the carton body in the assembled state.

At operation 1208, the first flap portions can be rotated inwardly to be perpendicular to the side wall portions to form an inner top wall, and at operation 1210, the lid portion can be rotated inwardly to be perpendicular to the side wall portions and to overlay the inner top wall to form an outer top wall. At step 1212, the lid portion can be locked in place via a tab extending from one of the side wall portions.

Figure 13:
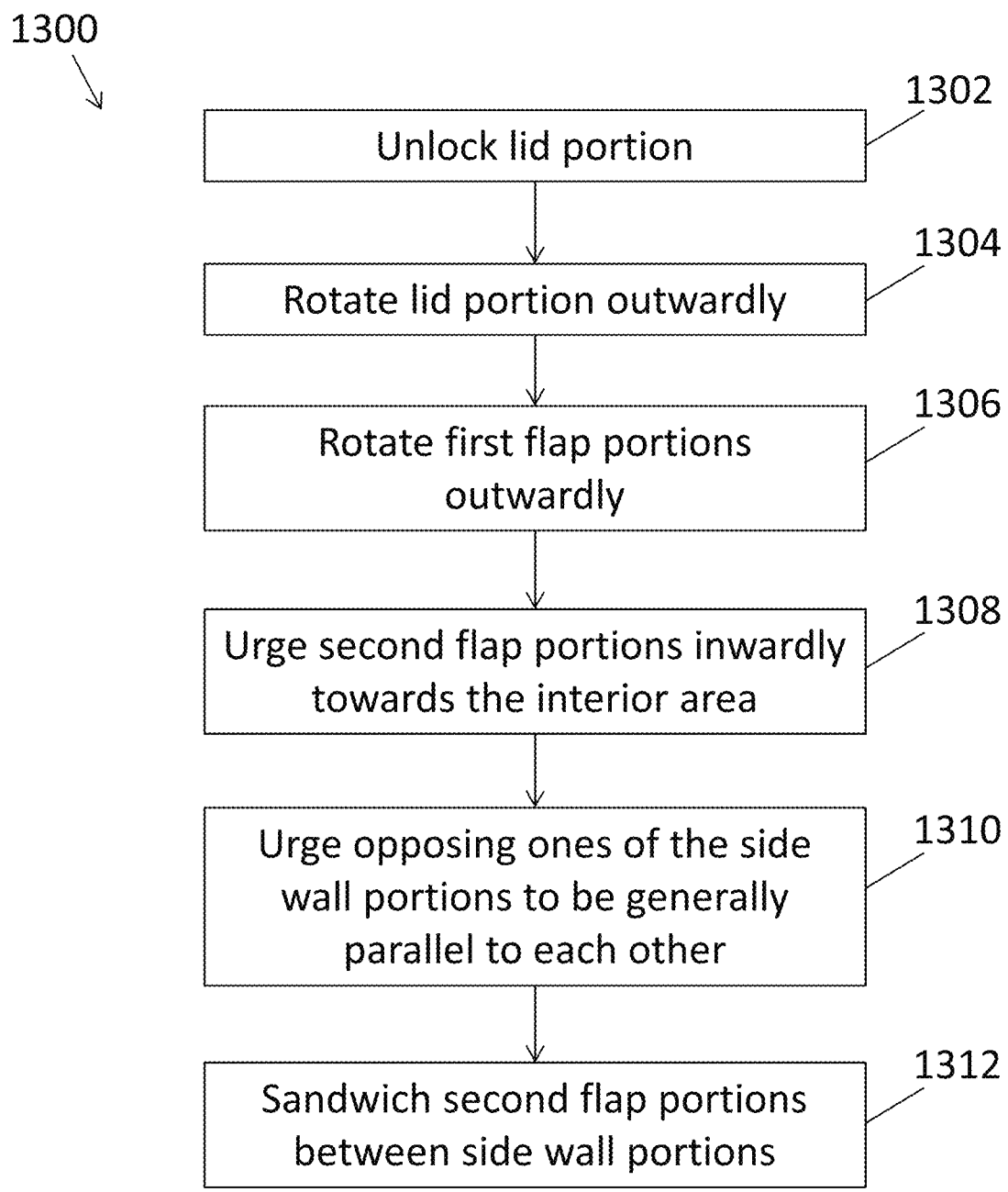
FIG. 13 is a flowchart illustrating a method of collapsing a break pack carton in accordance with embodiments of the present disclosure.

After use, the carton body can be returned to the collapsed state via a method 1300 illustrated by a flowchart shown in FIG. 13. For example, at operation 1302, the lid portion can be unlocked from one of the side wall portions. At operation 1304, the lid portion can be rotated outwardly away from the interior area, and at operation 1306, the first plurality of flap portions can be rotated outwardly away from the interior area. At operation 1308, the second plurality of flap portions can be urged inwardly towards the interior area to disengage the interlocking engagement of the three flap portions of the second plurality of flap portions. At operation 1310, the opposing ones of the side wall portions can be urged from being perpendicular to each other to being generally parallel to each other, and at operation 1312, the second flap portions can be sandwiched between the side wall portions to return the carton body to the collapsed state.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A reusable break pack carton, comprising:
   a single sheet of cardboard material having a perimeter with a first end and a second end;
   a plurality of fold lines formed in the single sheet of material, the plurality of fold lines including first and second fold lines extending in parallel to each other from the first end of the perimeter to the second end of the perimeter;
   a plurality of wall portions, each wall portion being bounded by at least three of the plurality of fold lines;
   a first plurality of flap portions bounded by the first fold line and the perimeter; and
   a second plurality of flap portions bounded by the second fold line and the perimeter, each of the flap portions in the second plurality having a different shape.

2. The reusable break pack carton of claim 1, wherein the first and second ends of the perimeter are operatively coupled to each other to form a carton body with an interior area.

3. The reusable break pack carton of claim 2, wherein the carton body is configured to be positioned in a collapsed state and an assembled state.

4. The reusable break pack carton of claim 3, wherein the first plurality of flap portions are disposed external to the interior area in the collapsed state.

5. The reusable break pack carton of claim 3, wherein the second plurality of flap portions are folded about the second fold line into the interior area and are sandwiched between the side wall portions in the collapsed state.

6. A reusable break pack carton, comprising: of claim 5,
   a single sheet of cardboard material having a perimeter with a first end and a second end;
   a plurality of fold lines formed in the single sheet of material, the plurality of fold lines including first and second fold lines extending in parallel to each other from the first end of the perimeter to the second end of the perimeter, the first end of the perimeter and the second end of the perimeter operatively coupled to each other to form a carton body with an interior area;
   a plurality of wall portions, each wall portion being bounded by at least three of the plurality of fold lines;
   a first plurality of flap portions bounded by the first fold line and the perimeter; and
   a second plurality of flap portions bounded by the second fold line and the perimeter, each of the flap portions in the second plurality having a different shape,
   wherein the carton body is configured to be positioned in a collapsed state and an assembled state,
   wherein the second plurality of flap portions are folded about the second fold line into the interior area and are sandwiched between the side wall portions in the collapsed state, and
   wherein in transition between the collapsed state and the assembled state, the second plurality of flap portions automatically rotate outwardly about the second fold line.

7. The reusable break pack carton of claim 6, wherein each of the second plurality of flap portions have an irregular shape.

8. The reusable break pack carton of claim 7, wherein first through third flap portions of the second plurality of flap portions automatically interlockingly engage to form a portion of a bottom wall in the assembled state.

9. The reusable break pack carton of claim 8, wherein two of the first through third flap portions of the second plurality of flap portions include locking tabs.

10. The reusable break pack carton of claim 9, wherein a fourth flap portion of the second plurality of flap portions rests on the first through third flap portions in the assembled state.

11. The reusable break pack carton of claim 10, wherein the interior area forms an undivided volume for receiving objects in the assembled state.

12. The reusable break pack carton of claim 11, wherein the first plurality of flap portions fold inwardly about the first fold line to be generally perpendicular to the side wall portions to form a layered top wall in the assembled state.

13. The reusable break pack carton of claim 12, wherein first through third flap portions of the first plurality of flap portions form an inner top wall in the assembled state.

14. The reusable break pack carton of claim 13, wherein a lid portion extends from the first fold line and folds inwardly towards the interior area to overlay the first through third flap portions of the first plurality of flap portions to form an outer top wall in the assembled state.

* * * * *